US007596869B2

(12) United States Patent
Berns

(10) Patent No.: US 7,596,869 B2
(45) Date of Patent: Oct. 6, 2009

(54) KNIFE

(75) Inventor: Harald Berns, Wuppertal (DE)

(73) Assignee: Martor KG, Solingen (DE)

( * ) Notice: Subject to any disclaimer, the term of this patent is extended or adjusted under 35 U.S.C. 154(b) by 142 days.

(21) Appl. No.: 11/312,800

(22) Filed: Dec. 20, 2005

(65) Prior Publication Data

US 2006/0130340 A1 Jun. 22, 2006

(30) Foreign Application Priority Data

Dec. 22, 2004 (DE) ...................... 10 2004 063 045

(51) Int. Cl.
*B62B 1/08* (2006.01)

(52) U.S. Cl. ............................................... 30/162; 30/2

(58) Field of Classification Search ....................... 30/2, 30/162, 329, 335, 339, 164
See application file for complete search history.

(56) References Cited

U.S. PATENT DOCUMENTS 4,683,656 A * 8/1987 Peyrot et al. .................. 30/162
5,617,635 A * 4/1997 Berns .......................... 30/162
6,044,562 A * 4/2000 Dillenbeck ................... 30/162
6,148,520 A * 11/2000 Berns .............................. 30/2
6,550,144 B1 * 4/2003 Berns .......................... 30/162
6,553,673 B2 * 4/2003 Peyrot et al. .................. 30/162
6,775,911 B2 * 8/2004 Tremblay .................... 30/162
6,785,966 B2 * 9/2004 Berns .............................. 30/2

* cited by examiner

*Primary Examiner*—Hwei-Siu C Payer
(74) *Attorney, Agent, or Firm*—Wildman, Harrold, Allen & Dixon LLP

(57) ABSTRACT

A blade holding device comprising a housing and a blade holder positioned within the housing wherein the blade holder is movable in a direction along a length of the housing. The device also comprises an actuator positioned within the housing and associated with the blade holder to move the blade holder along the length of the housing wherein the actuator moves parallel to the blade holder within the housing. Another embodiment of the blade holding device comprises a housing and a blade holder wherein the blade holder is adapted to move in a direction within the housing. An actuator associated with the blade holder for moving the blade holder in the direction and a control surface connected to a rearward end portion of the housing and positioned in a direction nonparallel to the direction in which the blade holder travels wherein the control surface is associated with the coupling arm.

36 Claims, 5 Drawing Sheets

KNIFE

RELATED APPLICATION

Foreign Application Priority Data:
Filed Dec. 22, 2004 [DE] Germany DE 10 2004 063 045.3

FIELD OF THE INVENTION

This invention relates to a blade holding device and more particularly a blade holding device wherein the blade is extendable and retractable.

SUMMARY OF THE INVENTION

The present blade holding device invention comprises a housing and a blade holder positioned within the housing wherein the blade holder is movable in a direction along a length of the housing. The invention further comprises an actuator positioned within the housing and associated with the blade holder to move the blade holder along the length of the housing and wherein the actuator moves parallel to the blade holder within the housing.

The present blade holding device invention comprises a housing and a blade holder wherein the blade holder is adapted to move in a direction within the housing. The invention further comprises an actuator associated with the blade holder to move the blade holder in the direction and a coupling arm secured to the one of the blade holder and the actuator. The coupling arm comprises an end for making a contact with the one of the actuator and blade holder which is not secured to the coupling arm and wherein the actuator is adapted to transmit a force to the blade holder through the contact and to move the blade holder in the direction. A control surface is connected to a rearward end portion of the housing wherein the control surface is positioned in a direction nonparallel to the direction, wherein the control surface is associated with the coupling arm to enable the coupling arm to move in a direction nonparallel to the direction to position the end to make the contact with movement of the actuator toward the forward end portion of the housing.

DETAILED DESCRIPTION OF THE INVENTION

Figure 2:
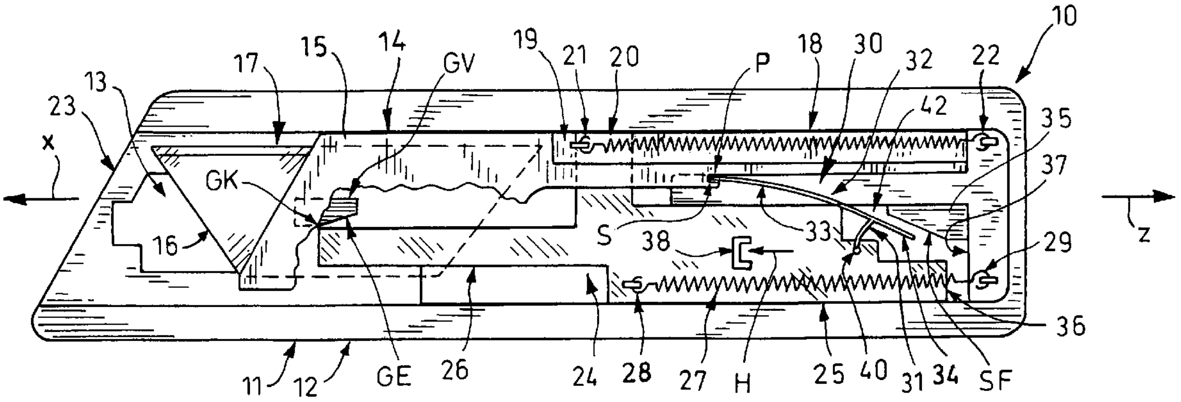
FIG. 2 is the view of the present invention of FIG. 1 with the actuator moved forward from the retracted position such that the end of the coupling member makes a contact with the blade holder.
Figure 3:
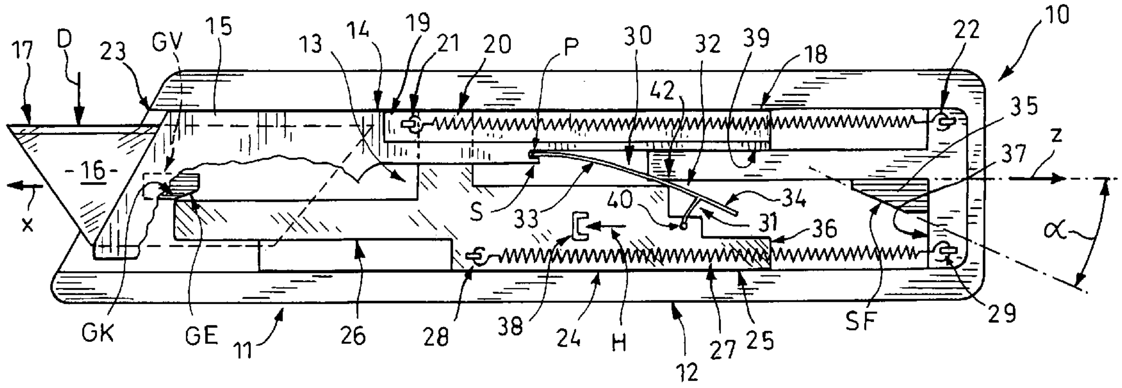
FIG. 3 is the view of the present invention of FIG. 2 with the actuator and blade holder moved further toward the forward end portion of the housing thereby positioning the blade in an extended working position.
Figure 4:
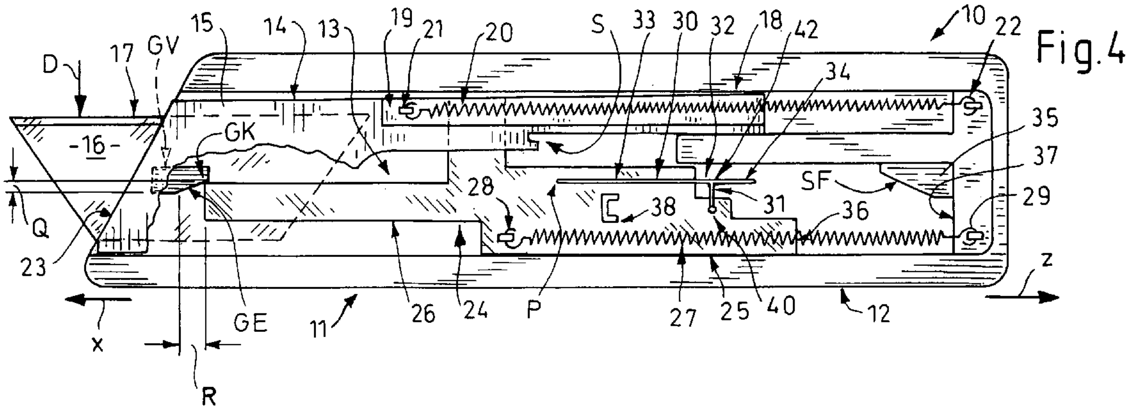
FIG. 4 is the view of the present invention of FIG. 3 with the blade receiving a force from a work piece, which results in the blade holder being displaced in two directions and the end of the coupling arm being removed from the contact it had with the blade holder.
Figure 4A:
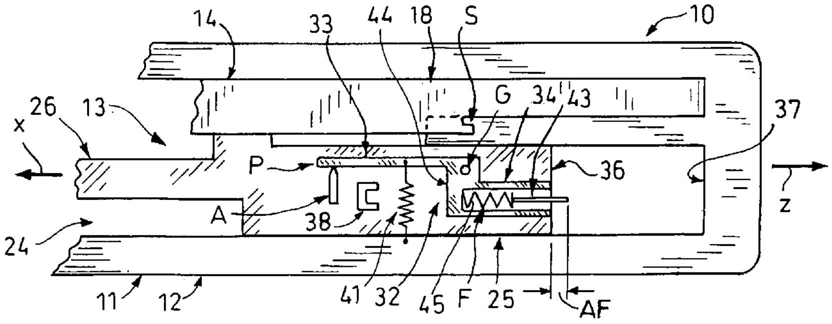
FIG. 4*a* is partially broken away view of another embodiment of the present invention as shown in FIG. 4.

In the drawings of the present invention, one embodiment of the invention is shown in FIGS. 1-4 and 5 and 6, while another embodiment of the present invention is shown in FIG. 4*a*.

Figure 1:
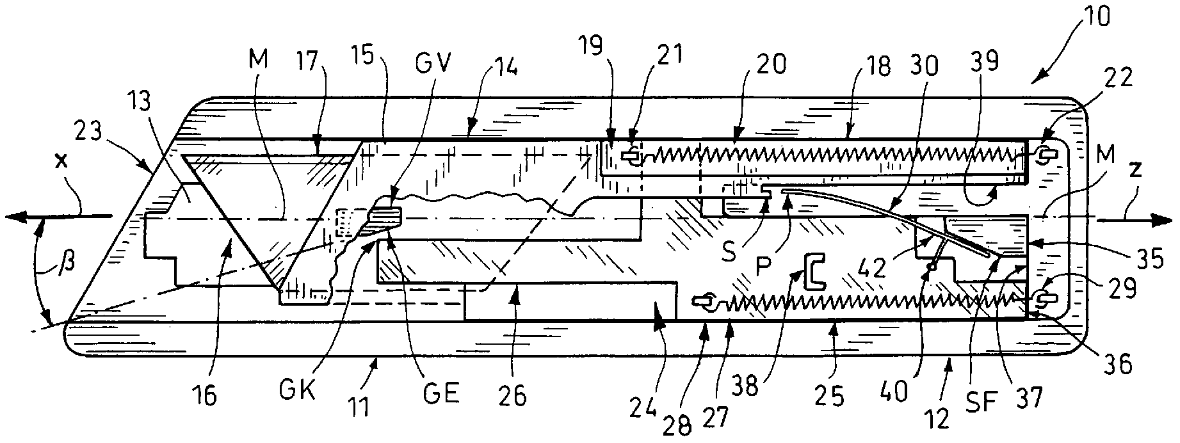
FIG. 1 is a side plan elevational view of one embodiment of the present invention with a portion of the housing removed and the blade in a retracted position.

In FIG. 1, knife 10 is shown with only one shell half 12 of a casing or housing 11 of a knife 10, here a safety knife.

The casing half 12 has a longitudinally extending cavity 13 in which a blade holder 14 is displaceable in a straight line along a center axis M in a forward extension direction x and a rearward retraction direction z.

A front end 15 of the blade holder 14 holds a sheet-steel knife blade 16 here of trapezoidal shape. The blade 16 has a cutting edge 17.

A part of the front end 15 of the blade holder 14 is shown broken away so as to expose other parts of the knife 10. Immediately rearward in the direction z of the front end 15 of the blade holder 14 is a guide formation 18 defining a longitudinally extending slot 19 holding a tension spring 20. A front end 21 of the tension spring 20 is anchored on the blade holder 14 and a rear-end eye 22 is hooked on the casing shell 12 at a rearward end portion of casing 12. The tension spring 20 urges the blade holder 14 rearward in the retraction direction z in the knife casing 11.

The front end 15 of the blade holder 14 has a laterally projecting slide formation GV that defines a planar slide face GE that forms a small acute angle β with the extension direction x.

Inside the cavity 13 there is also an actuating slide 24 that can move longitudinally in the extension direction x and retraction direction z in the longitudinal cavity 13.

The actuating slide 24 has a rear end 25 and a front end 26, the latter with a front slide edge GK.

Another tension spring 27 has a front-end eye 28 hooked on the actuating slide 24 and a rear-end eye 29 anchored to the housing shell 12 at the rearward end portion of housing 11. The tension spring 27 urges the actuating slide 24 rearward in the retraction direction z.

The blade holder 14 and actuating slide 24 can move in parallel paths with a limited relative lateral play Q.

The rear end 25 of the actuator slide 24 also carries in the longitudinal cavity 13 a generally T-shaped part 30 that is formed of an elastically deformable material, in particular spring steel. The T-shaped part 30 has a center leg 31 seated in the rear end 25 of the actuating slide 24 at 40. The end of the leg 31 projecting from the rear end 25 of the actuating slide 24 meets a T-crosspiece 32 at an intersection 42. The part of the crosspiece 32 extending forward from intersection 42 in the extension direction x is a coupling arm 33. The part of the crosspiece 32 extending rearward in the retraction direction z is a control arm 34 that coacts with a control face SF of a cam bump 35 that is formed on the casing shell 12.

Figure 5:
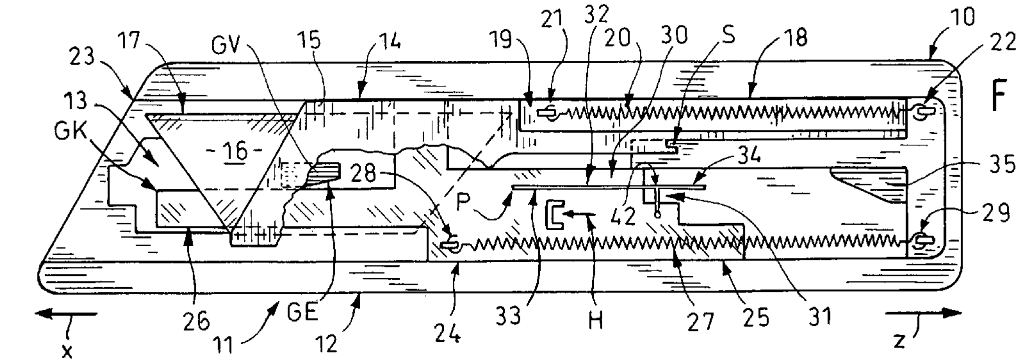
FIG. 5 is the view of the present invention of FIG. 4 wherein the blade holder retracts the blade toward the rearward end portion of the housing.
Figure 6:
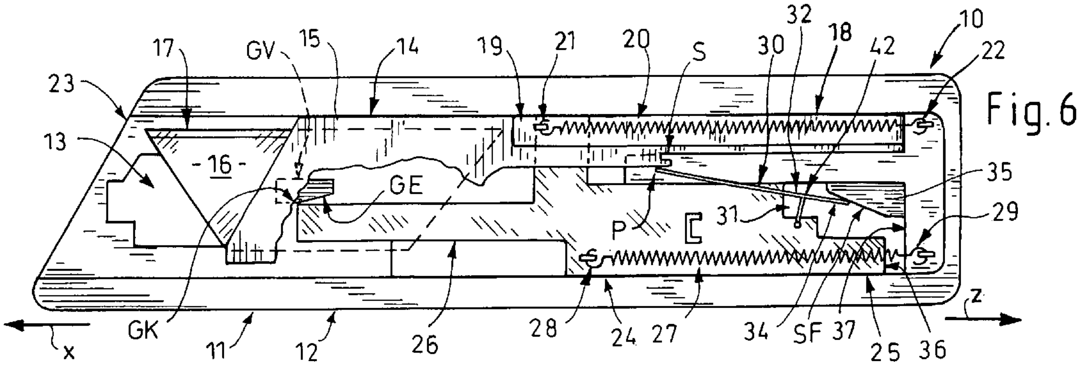
FIG. 6 is the view of the present invention of FIG. 5 wherein the actuator has moved closer toward the rearward end portion of the housing and the coupling arm is moved in a direction nonparallel to the direction of the length of the device for aligning the end of the coupling arm with the area of the contact as seen in FIG. 1 with the actuator in its fully retracted position.

The control face SF according to FIGS. 1-4 and to FIGS. 5 and 6 forms a slide face for the coupling arm 34 and defines a small acute angle α with the retraction direction z.

A front end of the coupling arm 33 forms a primary coupling element P while a coupling opening (cutout) forms a recess open in the rearward retraction direction z of the blade holder 14 forms a secondary coupling element S.

The crosspiece 32 thus forms a two-arm lever that has the coupling arm 33 of the coupling element P extending forward in the extension direction x from a pivot formed by the center leg 31 and on the other side of the pivot the control arm 34 extending rearward in the retraction direction z.

The control arm 34 can engage the control face or surface SF when the actuating slide 24 is drawn in the retraction direction into a rear position. This pivots the crosspiece 32 such that the primary coupling element P moves out of a freeing position outside the path of the secondary coupling element S into a ready position engageable in the secondary coupling element S.

The knife 10 operates as follows:

In FIG. 1 the knife 10 is in a rest position. The tension spring 27 has pulled a rear end face 36 of the actuating slide 24 against an abutment face 37 of the casing shell 12. At the same time the primary coupling element P is spaced at a slight distance (in the ready position) from the secondary coupling element S.

As shown in FIG. 2 a manual force H is applied in the extension direction x to an actuating projection 38 so that the control arm 34 pulls out of contact with the control face SF. At the start of outward movement in the direction z the primary coupling element P fits into the secondary coupling element S since the control arm 34 as a result of the springiness of the T-shaped part 30 continues to bear on the control face SF. This holds the primary coupling element P aligned with the secondary coupling element S.

The manual force H effective in extension direction causes the control arm 34 to move off the control face SF so that as shown in FIG. 3 the knife blade 16 projects through a slot or opening 23 in the knife housing 11.

A comparison of FIGS. 2 and 3 shows that the slide edge GK of the control projection 26 during the entire travel in the direction x from the FIG. 2 position to the FIG. 3 position is below the slide plane GE of the slide projection GV. FIG. 3 shows that the blade holder 14 and the blade 16 are not completely extended.

When as shown in FIG. 3 a cutting force D is applied, e.g. perpendicular to the edge 17 of the blade 16, the blade carrier 14 shifts downward as seen by comparing FIGS. 3 and 4 with its planar slide face GE along the slide edge GK through the transverse play Q and through a longitudinal offset R as shown in FIG. 4. This separates the elements P and S from each other while leaving the actuating part 24 advanced in the direction x into a forward position.

In any of the positions moving from FIG. 1 and to FIG. 4 it is clear that the force converter GE/GK formed by the slide face GE and the slide edge GK is always effective independent of the extended or withdrawn position in the directions x or z, so long as there is a lateral force D which can of course also be angled to the blade edge 17.

It is therefore possible for the knife 10 in the position of FIG. 4 to cut until the blade 16 exits the workpiece, whereupon the blade 16 is no longer held by the workpiece and the spring 20 pulls back the blade holder 14 until the position of FIG. 5 is reached. Once the edge 17 of the blade 16 is disengaged from the unillustrated workpiece the spring 20 is effective and the blade holder 14 along with the blade 16 it is holding are pulled in the retraction direction z back into a protected position in the knife casing 11.

It is also possible with an unillustrated embodiment as a result of the separation of the coupling between the elements P and S for the blade holder 14 with the blade 16 not to pull back in the retraction direction into the knife casing 11. Instead the potential energy of the tension spring stretched in the direction x can be used to extend a shield, for example a standard shield pin, parallel to the center axis along the blade edge 17 in order to reduce the likelihood of accidental cuts.

As shown in FIG. 5, the manual force H is still being applied and the actuating element or actuator 24 remains in its position advanced in the direction x.

When the manual force H is removed, the position of FIG. 6 is assumed, with the slide edge GK back at the lower end of the slide face GE. The rear end face 36 of the actuating slide 24 is still spaced from the knife-housing abutment face 37. Meanwhile the primary coupling element P is below the secondary coupling element S while the end of the control arm 34 of the T-shaped part 30 touches the control face SF of the control cam 35. The part 30 starts to deform elastically. This makes the control arm 34 work on moving backward in the retraction direction z against an axial spring force while at the same time the coupling arm 33 moving in the retraction direction z passes with its primary coupling element P the secondary coupling element S.

Going from the position of FIG. 6 to that of FIG. 1 makes the tension spring 27 fully effective since the rear end face 36 of the actuating slide 24 bears against the casing abutment face 37. At the same time the control arm 34 of the T-shaped part 30 pushes with increasing force against the control face SF of the control cam 35 and bends the T-shaped part 30 so much that the coupling arm 33 of the crosspiece 32 bears against a lower longitudinal edge 39 of the guide projection 18 and thus sets the primary coupling element P in a ready position at a slight spacing forward of the secondary coupling element S.

FIG. 4A corresponds to the functional position shown in FIG. 4. Here the crosspiece 32 is differently shaped as shown in FIG. 4A, in that it is formed of two offset rigidly interconnected parts forming a Z, namely a rigid coupling arm 33, a central rigid connection bight 44, and a rigid control arm 34 projecting from the rigid bight 44.

The central bight 44 is mounted at a pivot G in the rear end of the actuating slide 24. The coupling arm 33 forming the primary coupling element P is biased downward by a spring 41 against a schematically illustrated abutment A. Otherwise the operation of the system of FIG. 4A is analogous to that of FIGS. 5, 6, and 1.

The embodiment according to FIG. 4A has the advantage that as a result of the rigidity of the crosspiece 32 larger forces can be transmitted via the slide part 24 in the direction x to the blade holder 14, serving for instance for stabbing the blade 16 into thick cardboard.

In any case the T-shaped part 30 according to FIGS. 1-6 as well as the rigid crosspiece 32 of FIG. 4A form a two-arm lever in the broadest sense, having a lever arm 33 (coupling arm) and a lever arm 34 (control arm). The pivot axis is either defined by the flexible leg 31 above its anchor point 40 (FIGS. 1-6) or by the pivot G (FIG. 4A).

A particular feature of the embodiment of FIG. 4A is that the control arm 34 holds a spring-loaded bumper 43 effective parallel to the two directions x and z and that can be pushed through a spring travel AF created by a compression spring F to be flush with a rear end face 37 of the rear end 25.

The embodiment of FIG. 4A functions as follows:

Once the cutting operation is completed and the edge 17 of the blade 16 has separated from the workpiece, the tension spring 20 pulls the blade holder 14 back into its retracted position as shown in the position of FIGS. 5 and 6. The tension springs 20 and 27 are for clarity's sake not shown in FIG. 4A but are the same as in FIGS. 1-6.

Shortly before the actuating slide 24 (see FIG. 6) shown in FIG. 4 reaches its retracted position (see FIG. 1), in which the end face 36 of the actuating slide 24 engages the casing abutment face 37, the free end of the spring bumper 43 engages the casing abutment face 37. It is clear that in this embodiment of FIG. 4A, abutment face 37 forms control face SF (not shown in FIG. 4A) such as shown in FIG. 4 wherein the control surface would be aligned to engage spring bumper 43 with retraction of the actuator 24.

At the same time the primary coupling part P formed by the coupling arm 33 is swung upward against the guide extension 18 of the blade holder 14 and the bumper spring F in the control arm 34 is compressed until the spring bumper 43 is entirely in the control arm 34 and thus disappears in the rear end 25 of the actuating slide 24. During such inward travel of the spring bumper 43 the coupling arm 33 with its primary coupling element P travels also in the retraction direction z past the secondary coupling element S. This holds the coupling arm 33 in an upper pivoted position.

At the start of a subsequent outward movement of the actuating slide 24 in the direction x the bumper spring F extends somewhat. The bumper 43 projects to a certain extent from the control arm 34 and projects from the rear end 25 of the actuating slide 24 so that the primary coupling element P is shifted forward in the direction x out of its ready position (see FIG. 1) into the secondary element S (see FIG. 2) while the spring bumper 43 holds the coupling arm 33 in its upper pivoted position.

The invention claimed is:

1. A blade holding device, comprising:

a housing;

a blade holder positioned within the housing wherein the blade holder is movable in a direction along a length of the housing;

an actuator positioned within the housing and associated with the blade holder to move the blade holder along the length of the housing wherein the actuator moves parallel to the blade holder within the housing;

a coupling arm secured to one of the actuator and the blade holder, wherein at least a portion of the coupling arm is adapted to move in a direction nonparallel to the direction along the length of the housing; and a spring comprising two ends, wherein one end is secured to an intermediate portion of the coupling arm and the other end is secured to the housing, and wherein the spring exerts a force on the coupling arm in a direction nonparallel to the direction along the length of the housing.

2. The blade holding device of claim 1 includes an actuation projection connected to the actuator and positioned outside of the housing.

3. The blade holding device of claim 1 wherein the housing is elongated and includes forward and rearward end portions wherein the housing defines an opening in the forward end portion wherein a blade is extendable therethrough.

4. The blade holding device of claim 3 includes a tension spring comprising two ends wherein one end is secured to the blade holder and the other end is secured to the rearward end portion of the housing.

5. The blade holding device of claim 4 wherein the tension spring elongates as the blade holder moves toward the forward end portion of the housing and exerts a force on the blade holder in a direction toward the rearward end portion of the housing.

6. The blade holding device of claim 3 includes a tension spring comprising two ends wherein one end is secured to the actuator and the other end is secured to the rearward end portion of the housing.

7. The blade holding device of claim 6 wherein said tension spring elongates as the actuator moves toward the forward end portion of the housing and exerts a force on the actuator in a direction toward the rearward end portion of the housing.

8. The blade holding device of claim 1 wherein the coupling arm comprises an end.

9. The blade holding device of claim 8 includes a recess adapted to receive the end of the coupling arm and wherein the recess is associated with one of the blade holder and the actuator which is not secured to the coupling arm.

10. The blade holding device of claim 1 wherein the nonparallel direction is curvilinear.

11. The blade holding device of claim 1 includes a projection extending from the blade holder in a direction transverse to the direction along the length of the housing wherein the projection comprises a control surface positioned in a direction nonparallel to the direction along the length of the housing.

12. The blade holding device of claim 11 wherein the actuator is in contact with said control surface with the actuator moving toward the forward end portion of the housing.

13. The blade holding device of claim 11 wherein the control surface slides on the actuator displacing the blade holder in the direction along the length of the housing and perpendicular to the direction along the length of the housing relative to the actuator with a force applied to the blade holder.

14. A blade holding device comprising:

a housing;

a blade holder positioned within the housing, wherein the blade holder is movable in a direction along a length of the housing;

an actuator positioned within the housing and associated with the blade holder to move the blade holder along the length of the housing, wherein the actuator moves parallel to the blade holder within the housing;

a coupling arm secured to one of the actuator and the blade holder, wherein at least a portion of the coupling arm is adapted to move in a direction nonparallel to the direction along the length of the housing; and a control arm connected to the coupling arm, wherein the control arm extends in a direction opposite to a direction in which the coupling arm extends.

15. The blade holding device of claim 14 includes a control surface connected to the housing, wherein the control surface is positioned in a direction nonparallel to the direction along the length of the housing and wherein the control arm is adapted to contact the control surface and to move along the control surface resulting in movement to the coupling arm in the direction nonparallel to the direction along the length of the housing.

16. The blade holding device of claim 14 includes a bumper projection connected to the control arm wherein the bumper projection extends in a direction opposite to the direction in which the coupling arm extends.

17. The blade holding device of claim 16 includes a spring comprising two ends wherein one end is connected to the bumper projection and the other end is connected to the control arm.

18. The blade holding device of claim 17 includes a control surface connected to the housing, wherein the control surface is positioned in a direction nonparallel to the direction along the length of the housing and wherein the bumper projection is adapted to contact the control surface and to move along the control surface resulting in movement of the coupling arm in the direction nonparallel to the direction along the length of the housing.

19. The blade holding device of claim 17 includes the coupling arm secured to one of the actuator and the blade holder with a pivot member.

20. The blade holding device of claim 17 includes the coupling arm connected to a leg constructed of elastically deformable material wherein the leg is secured to one of the actuator and the blade holder.

21. A blade device, comprising:

a housing;

a blade holder wherein the blade holder is adapted to move in a direction within the housing;

an actuator associated with the blade holder for moving the blade holder in the direction of the movement of the blade holder within the housing;

a coupling arm secured to one of the blade holder and the actuator, wherein the coupling arm comprises an end for making a contact with the one of the actuator and the blade holder which is not secured to the coupling arm and wherein the actuator is adapted to transmit a force to the blade holder through the contact and to move the blade holder in the direction; and a control surface connected to a rearward end portion of the housing, wherein the control surface is positioned in a direction nonparallel to the direction of the movement of the blade holder, wherein the control surface is associated with the coupling arm to enable the coupling arm to move in a direction nonparallel to the direction in which the blade holder travels to position the end of the coupling arm to make the contact with movement of the actuator toward a forward end portion of the housing.

22. The blade device of claim 21 wherein the actuator is adapted to move parallel to the blade holder.

23. The blade device of claim 21 wherein the housing is elongated and the forward end portion of the housing defines an opening for permitting a blade to extend therethrough.

24. The blade device of claim 21 wherein the actuator is positioned within the housing.

25. The blade device of claim 21 wherein the coupling arm is constructed of elastically deformable material.

26. The blade device of claim 25 wherein the coupling arm is constructed of spring steel.

27. The blade device of claim 21 includes a recess for receiving the end of the coupling arm wherein the recess is associated with one of the blade holder and the actuator which is not secured to the coupling arm.

28. The blade device of claim 21 wherein the nonparallel direction of the control surface is curvilinear.

29. The blade device of claim 21 includes a spring comprising two ends wherein one end is secured to the coupling arm and the other end is secured to the housing wherein the spring exerts a force on the coupling arm in a direction nonparallel to the direction of travel of the blade holder within the housing.

30. The blade device of claim 21 includes a control arm connected to the coupling arm wherein the control arm extends in a direction opposite to a direction in which the coupling arm extends.

31. The blade device of claim 30 wherein the control surface is connected to the housing, wherein the control arm is adapted to contact the control surface and to move along the control surface resulting in imparting movement to the coupling arm in the direction nonparallel to the direction in which the blade holder travels.

32. The blade device of claim 30 includes a bumper projection connected to the control arm wherein the bumper projection extends in a direction opposite to the direction in which the coupling arm extends.

33. The blade device of claim 32 includes a spring comprising two ends wherein one end is connected to the bumper projection and the other end is connected to the control arm.

34. The blade device of claim 32 wherein the bumper projection is adapted to contact the control surface and to move along the control surface resulting in imparting movement to the coupling arm in a direction nonparallel to the direction of the travel of the blade holder within the housing.

35. The blade device of claim 21 includes a pivot member to secure the coupling arm to one of the actuator and the blade holder.

36. The blade device of claim 21 includes a leg connected to the coupling arm wherein the leg is constructed of elastically deformable material and wherein the leg is secured to one of the actuator and the blade holder.

* * * * *